United States Patent [19]
Bondeson et al.

[11] Patent Number: 5,814,790
[45] Date of Patent: Sep. 29, 1998

[54] APPARATUS AND METHOD FOR LIQUIFYING THERMOPLASTIC MATERIAL

[75] Inventors: Benjamin J. Bondeson, Buford; Paul S. Frates, Lawrenceville; Gregory J. Gabryszewski, Lithonia; Peter J. Petrecca, Dunwoody, all of Ga.

[73] Assignee: Nordson Corporation, Westlake, Ohio

[21] Appl. No.: 539,295

[22] Filed: Oct. 4, 1995

[51] Int. Cl.⁶ .............................. B67D 5/62; F27B 14/14
[52] U.S. Cl. ........................ 219/421; 219/422; 219/424; 219/425; 222/146.5
[58] Field of Search ..................... 219/421–426; 126/343.5 R, 343.5 A; 222/146.1, 146.2, 146.5

[56] References Cited

U.S. PATENT DOCUMENTS

| | | |
|---|---|---|
| 2,544,661 | 3/1951 | Fossa . |
| 2,665,823 | 1/1954 | Fossa . |
| 2,809,772 | 10/1957 | Weisz . |
| 2,851,577 | 9/1958 | Bolds et al. . |
| 2,987,599 | 6/1961 | Voss . |
| 3,352,279 | 11/1967 | Lockwood . |
| 3,377,466 | 4/1968 | Paulsen . |
| 3,531,023 | 9/1970 | Mercer . |
| 3,733,059 | 5/1973 | Pettit . |
| 3,792,801 | 2/1974 | Baker et al. . |
| 3,826,224 | 7/1974 | Baker et al. . |
| 3,876,105 | 4/1975 | Kelling . |
| 3,952,921 | 4/1976 | Tanner . |
| 4,024,854 | 5/1977 | Park et al. . |
| 4,197,070 | 4/1980 | Koschmann ......................... 222/146.5 |
| 4,308,447 | 12/1981 | Nötzold et al. . |
| 4,598,842 | 7/1986 | Sticher et al. . |
| 4,600,124 | 7/1986 | Price . |
| 4,666,066 | 5/1987 | Boccagno et al. . |
| 4,667,850 | 5/1987 | Scholl et al. . |
| 4,724,983 | 2/1988 | Claassen . |
| 4,771,920 | 9/1988 | Boccagno et al. . |
| 4,821,922 | 4/1989 | Miller et al. . |
| 4,848,420 | 7/1989 | Claassen . |
| 4,850,425 | 7/1989 | Anderson .............................. 222/146.1 |
| 4,898,527 | 2/1990 | Claassen . |
| 4,919,308 | 4/1990 | Majkrzak . |
| 5,240,656 | 8/1993 | Scheeres .................................. 219/421 |
| 5,535,920 | 7/1996 | Blair et al. ........................... 222/146.4 |

FOREIGN PATENT DOCUMENTS 953733  4/1964  United Kingdom .

OTHER PUBLICATIONS

Sta–Warm Brochure, "Coated Fabric", Sta–Warm Electric Company, Inc., North Chestnut Street, Ravenna, Ohio 44266, PB #7.

Sta–Warm Brochure, "Glue Melting Equipment", Sta–Warm Electric Company, Inc., North Chestnut St., Ravenna, Ohio 44266, G–8.

Sta–Warm Brochure, "Aid Plastic Coated Pipe Production", Sta–Warm Electric Company, Inc., North Chestnut St., Ravenna, Ohio 44266, Republic Steel Inst.

Sta–Warm Brochure, "Aid Plastic Coated Pipe Production", Sta–Warm Electric Company, Inc., North Chestnut St., Ravenna, Ohio 44266, Hill–Hubbell Inst.

Drawing, "Hot Melt Adhesive Tank", Sta–Warm Electric Company, Inc., North Chestnut Street, Ravenna, Ohio 44266.

(List continued on next page.)

*Primary Examiner*—Teresa J. Walberg
*Assistant Examiner*—J. Pelham
*Attorney, Agent, or Firm*—Wood, Herron & Evans, L.L.P.

[57] ABSTRACT

An apparatus for liquifying and supplying thermoplastic material including a melting hopper having a plurality of separately controlled heating zones. The hopper is formed of thin, rolled metal having a relatively low heat conductivity, such as carbon steel. Heaters are located along the length of the hopper and are separately controlled by way of thermostats or temperature sensors, such that the heat applied in a nonuniform manner to the thermoplastic material in the hopper during various stages of the melting and dispensing process.

14 Claims, 3 Drawing Sheets

OTHER PUBLICATIONS

Drawing, Sta–Warm AD 32 55 Compound Melter #34C21570, Jan., 1964.

Drawing, Sta–warm DWIOS Drum Warmer #34B27840 2/2, Oct., 1969.

Brochure, "Hot–Melt Processors", May Coating Technologies, Inc., 2280 Terminal Road, St. Paul, MN 55113.

Brochure, "200/400 Series Hot–Melt Drum Unloaders", May Coating Technologies, Inc., 2280 Terminal Road, St. Paul, MN 55113.

Brochure, Sta–Warm Electric Company, Inc., North Chestnut Street, Ravenna, Ohio 44266.

Brochure, "Cable Products", Sta–Warm Electric Company, Inc., North Chestnut St., Ravenna, OH 44266.

Brochure, "Coated Fabric", Sta–Warm Electric Company, Inc., North Chestnut St., Ravenna, OH 44266.

Brochure, "Aid Plastic Coated Pipe Production", Sta–Warm Electric Company, Inc., North Chestnut St., Ravenna, OH 44266.

Brochure, "Controlled Electric Heat", Sta–Warm Electric Company, Inc., North Chestnut Street, Ravenna, OH 44266.

Brochure, "Product Bulletin #3", Sta–Warm Electric Company, Inc., North Chestnut Street, Ravenna, OH 44266, 1980.

APPARATUS AND METHOD FOR LIQUIFYING THERMOPLASTIC MATERIAL

FIELD OF THE INVENTION

This invention generally relates to thermoplastic material melting and dispensing technology and, more specifically, to hopper type melting apparatus used for melting and dispensing so-called hot melt adhesives.

BACKGROUND OF THE INVENTION

Adhesive materials which are melted and liquified just prior to their application on a substrate are referred to as "hot melt" adhesives. Hot melt adhesives are available in bulk, in such forms as chicklets, pellets, slats and bricks and are also available in the form of a slug held in a container, such as a can, pail, or drum. A drum of bulk adhesive material may be as large as a conventional 55 gallon drum for large scale applications. The present invention is directed at solving various problems encountered with melting materials such as hot melt adhesives.

Often, hopper-type dispensers are used in the liquifying of hot melt adhesives. In the case of hot melt adhesive supplied as a slug in a container, it is desirous to cause the slug of adhesive to be removed from the container so that it may be efficiently melted when it comes in contact with a heated melting grid at the bottom of the hopper. A heated reservoir disposed beneath the melting grid receives the melted or liquified hot melt adhesive as it passes through the grid and maintains it in a heated liquid state. An outlet of the reservoir typically leads to a manifold and then a pump for pumping the liquid hot melt adhesive to other equipment, such as apparatus for applying material to substrates.

Prior hopper-type dispensers typically have one or more heaters disposed about the hopper. The heater or heaters may be attached to the side wall of the hopper to heat a container supported therein. To loosen a slug of adhesive from a container, adhesive along the inside surfaces of the container walls must be softened or melted to the extent that gravitational force on the adhesive slug can overcome the adhesive or frictional forces which tend to bind the adhesive to the walls and bottom of the container. When sufficient heating has occurred, the slug of adhesive will break loose from the walls of the drum, slide out of the drum and come into contact with the melting grid where the adhesive slug can be divided up into small portions and efficiently melted.

Prior melting hoppers have often been made from relatively thick plate gauge metal or a thick cast metal, the metal generally being a good conductor of heat, such as aluminum. The thick hopper wall in these prior devices provides a uniform temperature profile longitudinally along the hopper. Because of the thermal conductivity of the hopper's material of construction and because of the mass of these conventional hoppers, temperature variation between the heaters located about the hopper is relatively low. Generally, these thick walled hoppers were thought to be advantageous because of the uniform heat they applied to the container of adhesive within the hopper.

While these thick walled hoppers work adequately in some situations, they also present various problems. For example, the relatively thick hopper wall may be slow to reach the desired temperature. Similarly, the hopper wall may retain heat fairly well, causing it to be slow in cooling down. Also, thick hopper walls do not permit the temperature of the hopper wall to be rapidly varied during the process of loosening and dropping a slug of adhesive from a drum or other container or to allow the temperature applied to the hopper and, in turn, to the container, to be readily varied or controlled. Further, heating the entire length of the wall and the container after the adhesive begins moving out of the drum onto the melting grid wastes energy since areas of the hopper and container are being heated when they contain little or no adhesive.

Another problem related to conventional hoppers relates to the adhesive left within the hopper while a new container is being inserted into the hopper. Specifically, when heat is fully maintained along the length of the hopper during the insertion and slug release process, this heat, combined with heat from the grid and any other heating devices may cause the adhesive left in the hopper from the previous container to overheat and char or otherwise degrade.

SUMMARY OF THE INVENTION

One object of this invention has been to provide a hopper which may be heated in a nonuniform manner.

Another object of the present invention has been to provide a hopper which may be quickly heated to different temperatures in different areas of the hopper.

Still another object of this invention has been to prevent charring or degradation of adhesive within the hopper while a new drum or container is being loaded into the hopper.

It has been yet another object of the invention to provide a thin-walled hopper which is economical to manufacture and allows heat to be applied in a zone controlled fashion.

Accordingly, the present invention provides an apparatus for melting thermoplastic material such as thermoplastic hot melt adhesive including a thermally controlled hopper having distinct heating zones controlled independently of one another. Specifically, the hopper includes a first space for receiving thermoplastic material to be melted and a second space for melting the thermoplastic material. First and second heaters are respectively connected to transfer heat to the first and second spaces or heating zones of the hopper and a control is connected to the first and second heaters for operating the respective heaters independently of one another and in a manner allowing the first and second heaters to be operated and maintained at different temperatures. A container support is provided for supporting a container of thermoplastic material within the hopper such that an open end of the container faces the second space.

In the preferred embodiment, the hopper is economically formed from rolled sheet metal material having a relatively low heat conductivity. The sheet metal is preferably carbon steel having a thickness of about 0.09". Band heaters surround the outside of the hopper at spaced apart locations along the length of the hopper and heat is conducted through the thin walled hopper in relatively localized areas immediately adjacent the band heaters and into the first zone. As the hopper wall is formed from a material which is a relatively poor heat conductor, when compared to aluminum, heat is transferred through the thickness of the thin wall but not efficiently transferred in a lengthwise direction to other areas along the hopper.

Thus, separate heating zones are easily provided for in a cost effective manner by the thin-walled hopper. A significant benefit of providing separate heating zones is that, for example, a lower zone may be maintained at a lower temperature than an upper zone during a container insertion operation and during the relatively intense heating intended to cause quick release of a slug of material from a new container. As the lower zone is maintained at a lower temperature during this time, charring and degrading of the adhesive in this zone is reduced. Moreover, once the material has moved into the lower zone, the temperature of the independently controlled upper zone may be lowered.

Preferably, a third heater is operatively connected at the top of the first space in an area surrounding an opening thereof which receives the container and the control also operates the third heater independently of the first and second heaters to create a third heating zone. A melting grid is mounted in the second space or heating zone, which is preferably in a lower portion of the hopper relative to the first space or heating zone, for receiving thermoplastic material such as adhesive thereon. A fourth heater is operatively connected to the melting grid and the control preferably operates the second and fourth heaters together, i.e., such that they are both operated at the same temperature and on the same heating cycle within the second heating zone. It is contemplated, however, that these heaters could be operated independently of each other as well.

An extension of the hopper is provided between the melting grid and the reservoir and is formed from the same thin sheet metal as the upper portion of the hopper. This extension provides a heat conduction barrier between the melting grid and the reservoir such that the melting grid heaters and reservoir heaters may be better operated in an independent manner. An on demand melting control is provided to operate the second and fourth heaters, i.e., the melting grid and lower hopper heaters, when the level of liquid in the reservoir drops below a predetermined level.

The present invention further contemplates a method of operating a hot melt adhesive melting apparatus as described above. The method generally involves heating the first space at a first temperature to promote liquification of the thermoplastic material and movement of the material from the open end of the container into the second space and heating the second space at a second temperature which is lower than the first temperature. Generally, the first temperature will be above the recommended application or dispensing temperature of the thermoplastic material. More specifically, with hot melt adhesive materials the first temperature may be approximately 100° F. higher than the second temperature or more.

Additional advantages of the present invention will become more readily apparent to those of ordinary skill in the art upon review of the following detailed description of a preferred embodiment thereof taken in conjunction with the accompanying drawings.

DETAILED DESCRIPTION OF THE PREFERRED EMBODIMENT

Figure 1:
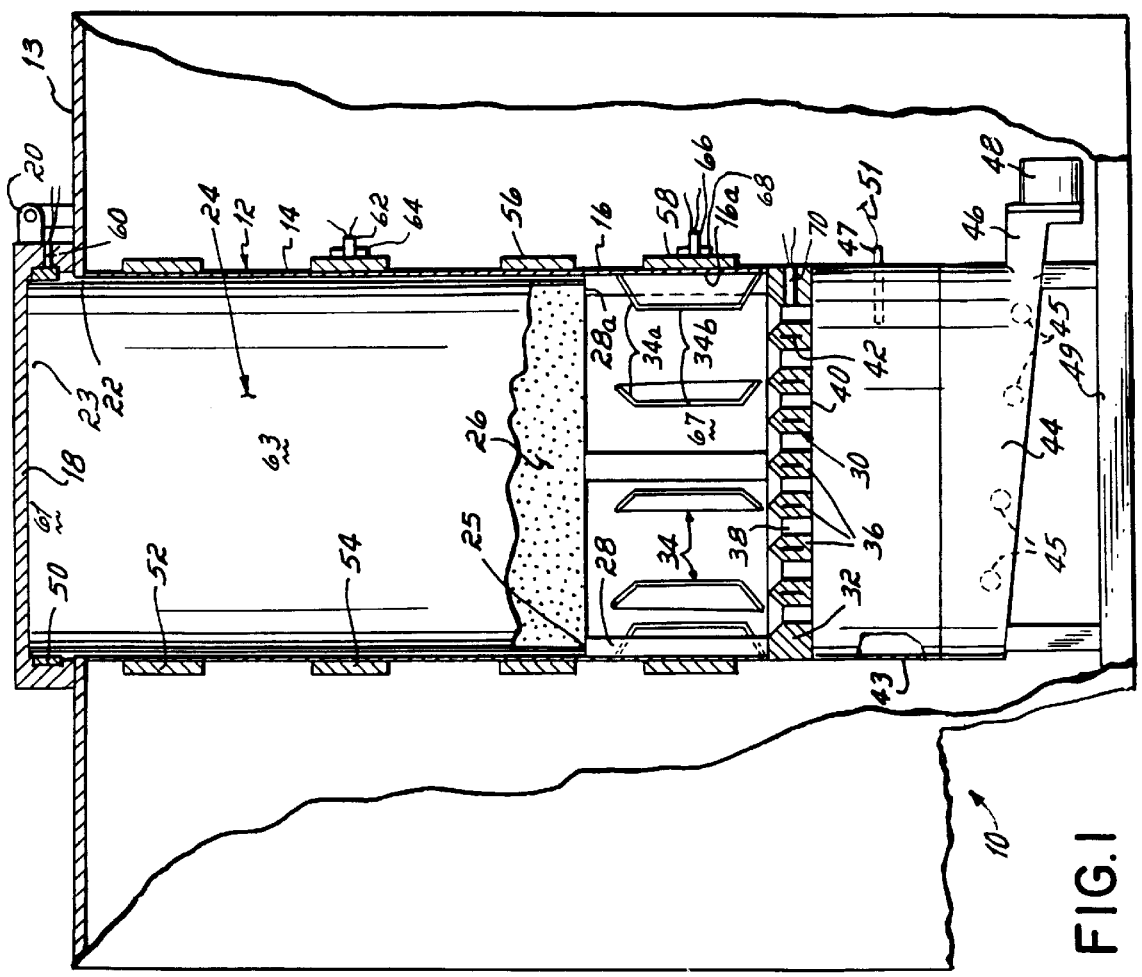
FIG. 1 is an axial cross-section of a hopper dispenser unit schematically showing hopper heaters in accordance with the principles of the present invention.

Referring first to FIG. 1, a melting unit 10 constructed in accordance with the present invention is shown and generally includes a hopper 12 contained within a housing 13. Housing 13 also contains other components of apparatus 10, such as electrical and fluid control components which have been left off the drawings for clarity. Hopper 12 is formed of thin rolled steel, preferably about 0.090 inch thick. Hopper 12 includes a container receiving upper hopper portion 14 and an adhesive slug receiving lower hopper portion 16. A lid 18 is mounted to housing 13 by way of a hinge 20 adjacent an open upper end 22 of housing 13 and hopper 12. One end 25 of a container 24 is opened prior to insertion into the hopper 12. Container 24 is then inverted and the relative upper end may either be removed or punctured to provide venting to the inside of container 24. Typically then, end 23 of container 24 adjacent to lid 18 will have been the bottom end of container 24 prior to insertion into upper portion 14 of hopper 12.

Container 24 is preferably spaced from a melting grid 30 when inserted into hopper 12 as shown in FIG. 1. This can be accomplished by supporting open end 25 of container 24 on a plurality of, for example, four elongated drum support members 28 which extend upwardly from the melting grid 30 and specifically from peripheral support portions 32. Drum support members 28 also extend radially inwardly from lower portion 16 of hopper 12. Support members 28 are preferably formed from a high strength material, such as carbon steel, which is not easily damaged by heavy drums and which has a low heat conductivity. Alternatively, depending on the application support members 28 may be formed from a more conductive material, such as aluminum. Upper surfaces 28a of each support member 28 receive a peripheral edge or rim portion of drum 24 at the open end 25. As will be appreciated by a review of FIGS. 1 and 2, support members 28 extend radially inwardly past the edge or rim of drum 24 such that they each provide support for adhesive slug 26 and prevent free falling of slug 26 from drum 24 and possible damage to the melting grid 30. Container 24 may, for example, be a 55 gallon drum which holds a slug 26 of hot melt adhesive in bulk form.

Alternatively, container 24 may be supported above grid 30 in the hopper 12 by a ring or web, such as illustrated in U.S. Pat. No. 4,724,983 to Claassen or suspended with a clamp member, such as illustrated in U.S. Pat. No. 4,919,308 to Majkrzak.

A plurality of heating fins 34 may also be attached to the walls of the hopper 12 in the lower portion 16 thereof. Heating fins 34 are described more fully in U.S. patent application Ser. No. 08/539,172 entitled "Thermoplastic Material Melting Apparatus", filed concurrently herewith, and the disclosure thereof is incorporated by reference herein.

Figure 2:
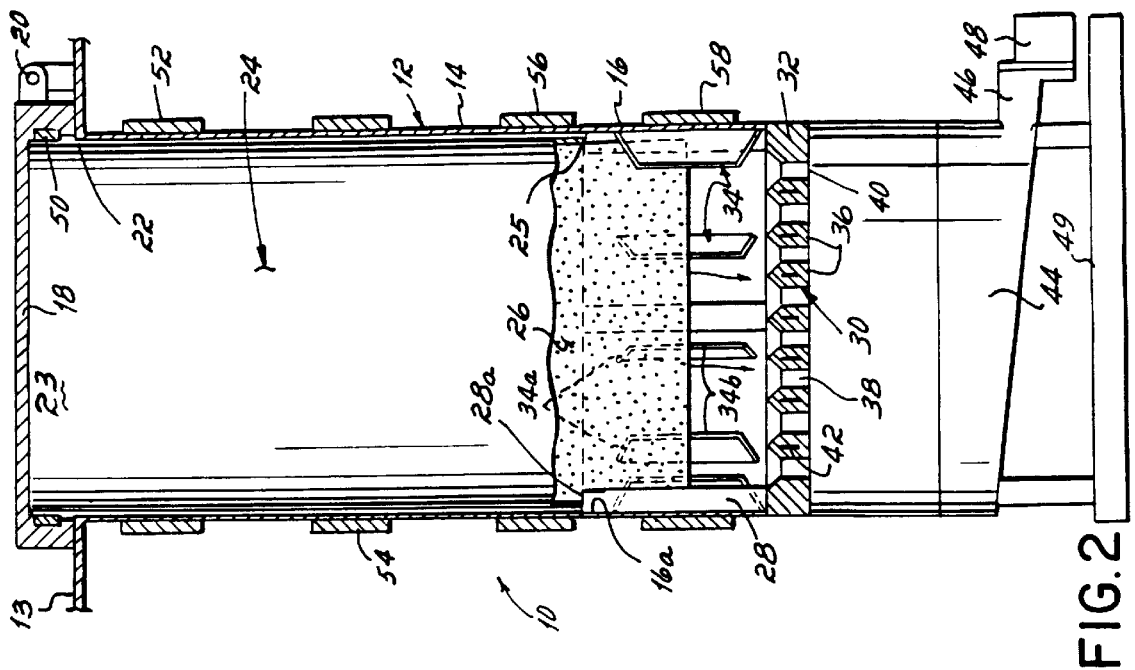
FIG. 2 is an axial cross-section of the hopper dispenser unit similar to FIG. 1 but eliminating various heating control devices for clarity and showing a slug of hot melt adhesive exiting the container, prior to contacting a melting grid.

Still referring to FIGS. 1 and 2, melting grid 30 may comprise a plurality of intersecting heated grid members 36, 38 which define openings therebetween for allowing melted or liquified hot melt adhesive material to pass through. As shown in FIGS. 1 and 2, grid members 36, 38 may each include heating elements 42 therein, although only the heating elements 42 of members 36 are shown in the drawings. An extension or cylindrical hopper portion 43 extends between grid 30 and a lower reservoir 44. Hopper portion 43 and reservoir 44 receive the liquid hot melt adhesive material which passes through melting grid 30. For the purposes of maintaining this hot melt adhesive in a liquid state suitable for dispensing, conventional heating elements 45 are provided within reservoir 44. Hopper portion 43 is formed from the same thin sheet metal material as hopper portions 14 and 16 as is apparent from the fragmented area of FIG. 1. A level sensor 47 is provided within hopper portion 43 and, as will be explained below, sensor 47 is connected to a control by lead 51 and indicates to the control when to activate and deactivate the melting process in hopper portion 16 according to the level of liquid in reservoir 44 and hopper portion 43. Preferably, level sensor 47 is a high temperature sensor sold under product no. KS-25G-M32 by Rechner Electronics Industries in Niagara Falls, N.Y.

Reservoir 44 includes an outlet 46 connected to a conventional manifold and pump assembly 48 which pumps the liquified hot melt adhesive to a hot melt dispensing apparatus (not shown) of a type depending on the particular application. A base support 49 is provided beneath reservoir 44 to provide upright support for hopper unit 10 in housing 13 as shown in FIGS. 1 and 2.

A band heater 50 is contained within lid 18 and surrounds the end 23 of the container 24 and heats the lid 18. Band heaters 52, 54, 56 are spaced longitudinally along the upper outer portion 14 of the hopper 12 so as to be disposed in the vicinity of the body of container 24, generally between its ends 23, 25. Another band heater 58 is mounted about the lower portion 16 of hopper 12 generally adjacent the melting grid 30 and functions to heat the lower portion 16 as well as to heat fins 34 and, to a lesser extent, steel support members 28 by conduction through hopper portion 16.

A temperature sensor or transducer 60 is mounted within the lid 18 in a contacting relationship with band heater 50 to measure temperature in heating zone 61. A second temperature sensor or transducer 62 is mounted within a conductive block 64 that in turn is mounted to band heater 54. Temperature sensor 62 measures the temperature within heating zone 63 in the container receiving portion 14 of hopper 12 that is heated by band heaters 52, 54, 56 and which is located below lid 18 and heating zone 61. Another temperature sensor or transducer 66 is mounted within a conductive block 68 that in turn is attached to band heater 58 of lower hopper portion 16. Temperature sensor or transducer 66 measures the temperature within heating zone 67 in the hopper 12 generally defined as lower adhesive receiving portion 16 of hopper 12. A fourth temperature sensor or transducer 70 is mounted within the melting grid 30 and measures the temperature of grid 30 which is heated by heaters 42. Preferably, temperature sensors 60, 62, 66, 70 are standard nickel resistance temperature device ("RTD") sensors having a 120 ohm resistance. Further temperature sensors may be provided and/or the locations of those shown in the drawings may be altered according to the needs of a particular application.

Figure 3:
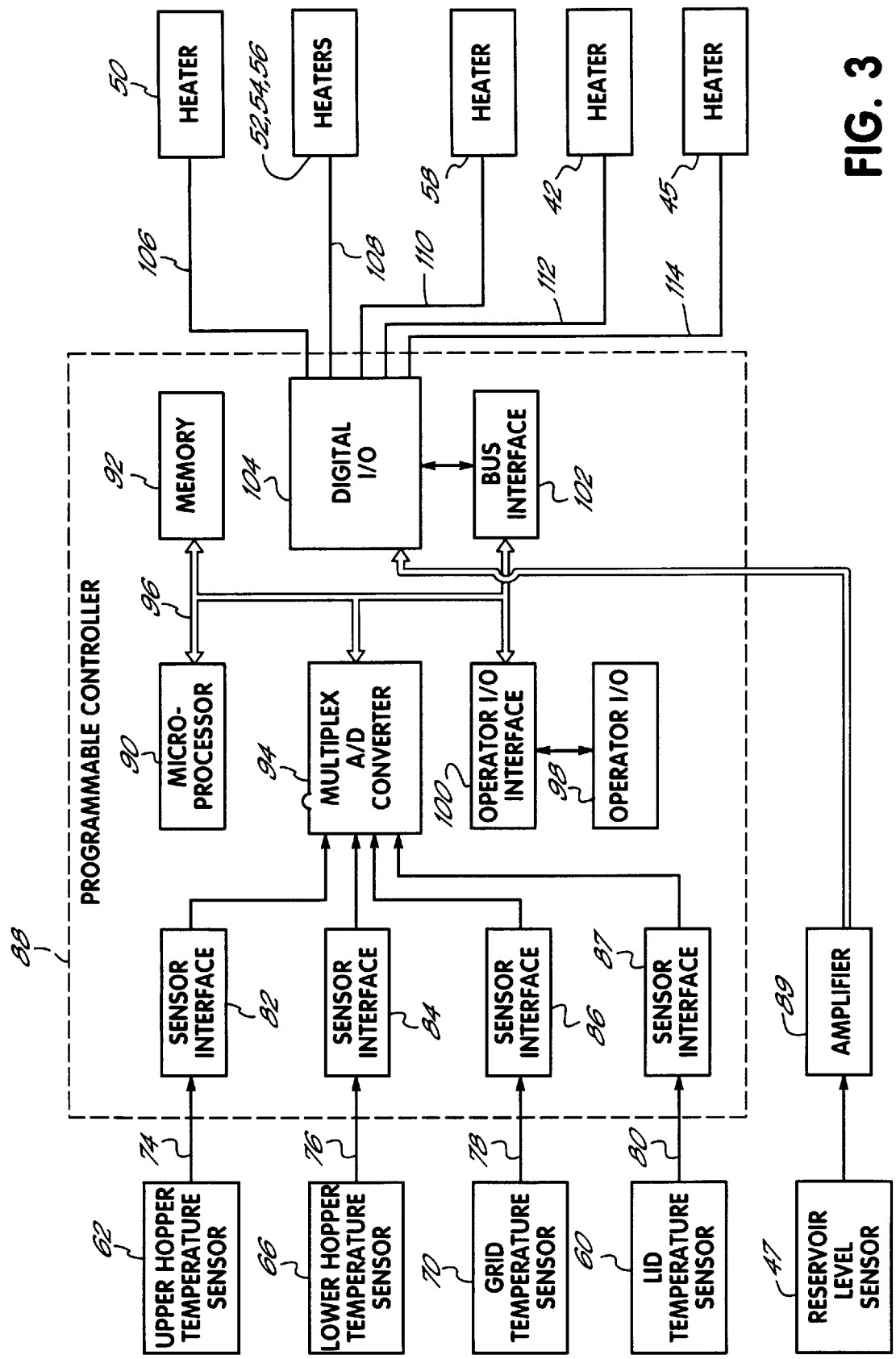
FIG. 3 is a schematic block diagram of a heater control in accordance with the principles of the present invention.

As shown in FIG. 3, temperature sensors 62, 66, 70, 60, provide temperature feedback signals on outputs 74, 76, 78, 80, respectively, which are connected to temperature sensor interfaces 82, 84, 86, 87 respectively, within a programmable controller 88. Preferably, the sensor interfaces 82, 84, 86, 87 are RTD interfaces. The controller 88 includes a microprocessor 90 that executes programs or routines stored in memory 92. At appropriate times, as determined by operating programs in memory 92, the microprocessor 90 samples analog signals with the analog to digital (A/D) converter 94. With successive samples, the A/D converter 94 sequentially reads the values of analog signals from the temperature sensors 62, 66, 70, 60 which are processed by the respective interfaces 82, 84, 86, 87. The analog values representing temperature are converted by the A/D converter to corresponding digital representations of temperature that are transferred over the bus 96 and stored in memory 92. The memory 92 also contains various temperature set point values for heating zones 61, 63, 67 within the hopper 12. Those set point values are either default set point values established by the controller 88, or, are input by the user through the operator I/O 98. The microprocessor 90 receives the user generated temperature set point values through the operator I/O interface 100 and stores the user generated set point values in the memory 92. In addition, temperature set point values may be calculated by the microprocessor 90 in accordance with existing process conditions.

The controller 88 provides a closed loop control of temperature in the preferred heating zones 61, 63, 67 (FIG. 1) by executing a known proportional, integral, derivative ("PID") control using the temperature set point values stored in the memory 92 and the temperature feedback signals which are sensed by the temperature sensors 60, 62, 66, 70. The programmable controller 88 produces output signals through the bus interface 102 and digital I/O 104 over respective output lines 106, 108, 110, 112 to turn ON or OFF the various heaters 50, 52, 54, 56, 58 and 42 in order to maintain the temperatures in heating zones 61, 63, 67 (FIG. 1) equal to the desired temperature set point values. Heaters 45 in reservoir 44 (FIG. 1) will also be controlled by programmable controller 88 and operated by I/O 104 over output line 114 in a conventional manner.

Digital I/O 104 also receives a digital input signal from an amplifier control unit 89. Amplifier control unit is preferably one obtained from Rechner Electronics Industries under product no. KSA70-250-S-88. Reservoir level sensor 47 sends an analog signal to amplifier control unit 89 which is indicative of the level of liquid in hopper portion 43 (FIG. 1) by either being in contact or not being in contact with liquid. The signal received from sensor 47 is transferred to I/O 104 as an ON/OFF digital signal which, in turn, is used to operate heaters 42 and 58. That is, if the level of liquid drops below sensor 47 (FIG. 1), then the "ON" signal will be sent and I/O 104 will turn heaters 42 and 58 ON. If the level of liquid reaches sensor 47, an "OFF" signal will be sent and I/O 104 will turn heaters 42 and 58 OFF.

Figure 4:
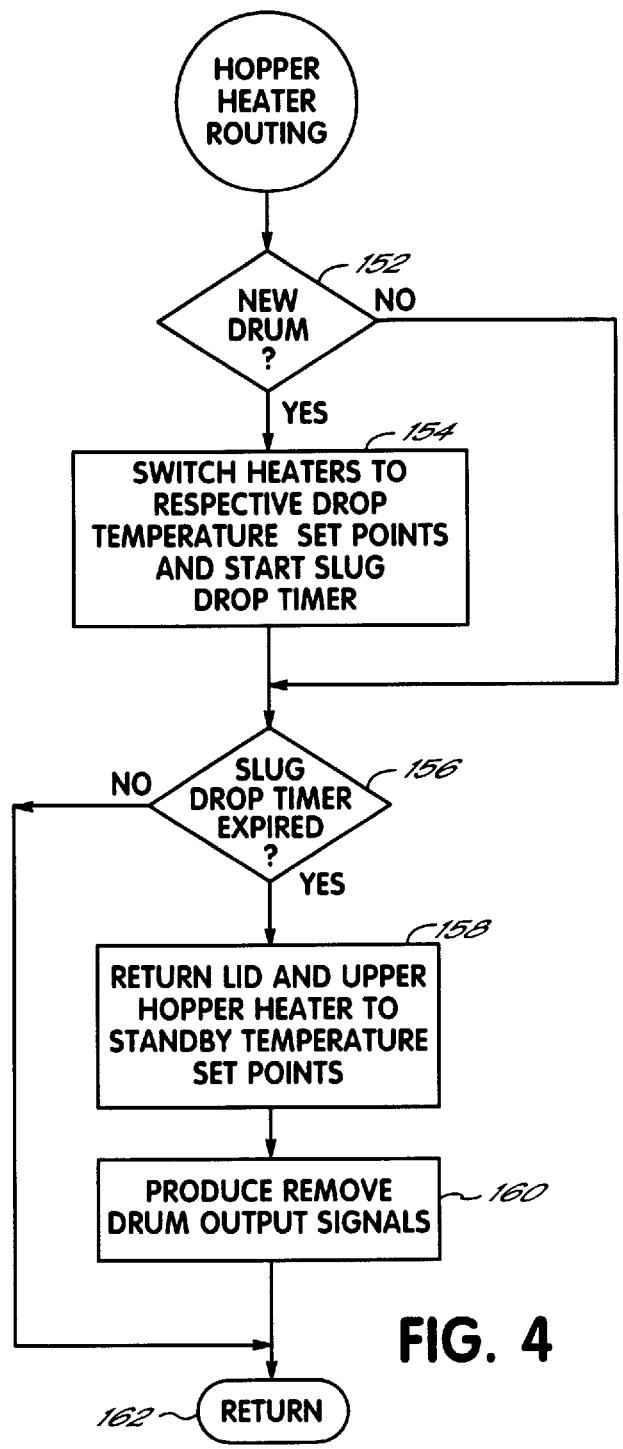
FIG. 4 is a flow chart illustrating a hopper heating cycle in accordance with the principles of the present invention.

FIG. 4 illustrates one hopper heater control routine or program which may be used in carrying out this invention. This program is stored in the memory 92 and executed by microprocessor 90 at appropriate times in the operating cycle of the program controller 88.

Referring to FIGS. 1 and 3 in conjunction with FIG. 4, anytime unit 10 is on, hopper 12 is ready to receive a new container 24. At that time, the lid 18 is opened and a new container 24 is loaded into the hopper 12 with an open end 25 facing down and with the other end 23 preferably open or at least having a vent hole cut or punched therein. After the new container 24 is loaded and the lid 18 is closed, the operator actuates a push button or otherwise provides an input to the programmable control via the operator I/O 98 which produces a new container signal over the operator I/O interface 100 that is detected by the microprocessor 90 as indicated at 152 of FIG. 4.

After the programmable controller 88 detects that a new container has been loaded, the microprocessor 90, at 154, then switches the temperature set point for the lid heater 50 of heating zone 61 and the upper hopper heaters 52, 54, 56 of heating zone 63 to their respective slug drop temperature set point values and starts a slug drop timer. The slug drop temperature set point values for zones 61 and 63 are typically higher than the application temperature set points and are selected to quickly melt the outer layer of adhesive slug 26 within container 24 thereby loosening slug 26 and allowing it to gradually slide or drop from container 24 (FIG. 2). Again, the slug drop temperature set point values will depend on the type of adhesive in the container and are above the application temperature but below the flash point of the adhesive. Typically, the slug drop set point temperatures are preferably approximately 56° C. (100° F.) above the recommended application temperature of the adhesive. The slug drop set point temperatures of the lid heater 50 and upper hopper heaters 52, 54, 56 may be the same and have been set to about 350° F. for PUR materials and 400°–450° F. for PSA materials.

As hopper 12 has very thin metal walls, the heat from the upper hopper heaters 52, 54, 56 will be quickly transferred through hopper 12 to container 24. This allows the outer periphery of the slug to soften and melt so that it may slide from the container 24 where it may be melted efficiently by the melting grid 30.

There are a number of ways in which an operator may be informed that slug 26 has been dropped from container 24 and therefore that container 24 may be removed. One of these ways is incorporated into the routine of FIG. 4 at process step 156. As mentioned above, this option involves utilizing a timer that will provide an indication that sufficient time has elapsed from the start of the dispensing cycle that the slug of material should have come in contact with the melting grid 30. In utilizing the timing device, it will be understood that the time necessary for slug 26 to slide out of container 24 into contact with the melting grid 30 will vary depending on the adhesive being dispensed, the construction of the container (steel, fiber, etc.), whether the container has been vented, as well as the various temperature set points of the different heating zones. That period of time, however, may be determined by experimentation and experience with a given type of material and set of other parameters as mentioned.

Alternatively, an automatic detection system can be used in which it can be determined that the container may be removed. One such automatic detection system is set forth in commonly assigned U.S. patent application Ser. No. 08/539,085 for "Melting Apparatus with Material Release Sensing System", the disclosure thereof hereby fully incorporated by reference herein. Such a system may inform the operator by some means, such as through the programmable controller 88, that the container 24 is ready for removal from the hopper 12.

Once the slug drop time period expires as detected at process step 156 in FIG. 4, or, alternatively, once the slug drop output signal is detected from a slug drop sensing system as mentioned above, the microprocessor 90 at process step 158 turns lid heater 50 off and returns upper hopper band heaters 52, 54, 56 to their standby temperature set points. The values for the standby temperature set points are preferably chosen so that the adhesive will not stick to the hopper wall during normal dispensing operation. However, the standby temperature set points should also be low enough so that there is no significant melting of the adhesive by the upper hopper heaters 52, 54, 56. Again, during normal operation, band heater 58 in the lower portion 16 of the hopper 12 may have a temperature set point that is equal to the temperature set point of the grid heater 42. The process at 158 provides different and selectable controlled temperatures in the three heating zones 61, 63, 67 within the hopper 12 so that the proper melting of the adhesive slug occurs.

Expiration of the slug drop timer at 156 or detection of a slug drop output signal from a slug drop sensing control also means that the slug 26 has dropped from the drum 24 and is being supported by a combination of the vertical support members 28 (FIG. 2) and the grid 30. As previously mentioned, the drum 24 may then be removed from the hopper 12; and at process step 160, the microprocessor 90 provides an output signal to the operator I/O 98 indicating that the drum 24 may be removed.

Referring also now to FIG. 1, at this point, the contained volume of the hopper 12 may be maintained at three different and selectable temperatures that vary longitudinally along hopper 12. With most operating conditions, the temperature set point for heating zone 67 in the lower portion 16 of hopper 12 is set to be equal to the desired temperature set point of the grid 30. However, the temperature set point for heating zone 67 may be independently controlled to any temperature set point value independent from grid 30 if desired or necessary for a particular application.

In summary, the hopper heating routine illustrated in FIG. 4 is a subroutine which microprocessor 90 runs through at appropriate times during a main routine, which may be an otherwise conventional operating routine stored in memory 92. Each time this subroutine is run, the microprocessor will return to the main routine as indicated at process step 162.

Although not necessary for the operation of the unit in terms of loading a new drum, it is generally desirable and known to include a warm-up cycle for the system components, although for clarity this has not been illustrated in the flow chart of FIG. 4. A cold startup may occur from an initial power ON situation in which the entire dispenser unit 10 (FIG. 1) is at ambient temperature and must be brought up to a desired temperature prior to initiating dispensing. In other situations, there may be interruptions in the dispensing process during which the melted adhesive within reservoir 44 cools below desired temperature. In these situations, unit 10 may go through a warmup cycle to a desired temperature prior to continuing the application process.

One warm up cycle that has been utilized with the present invention includes controlling the hopper to a standby temperature and the grid, reservoir and other downstream components to a set-point temperature. Specifically, heater 50 in heating zone 61 may be turned off. Heating zone 63 may be set to a standby temperature in the range of just above the softening point of the adhesive, such as to about 260° F. for PSA materials, down to having the heaters completely turned off as may be the case with PUR adhesives. Heating zone 67 may be controlled to a set point temperature as may reservoir 44 and other downstream components. The set point temperature for heater 58, grid 30, reservoir 44 and other downstream components may be approximately 250° F. for PUR adhesives and approximately 350° F. for PSA materials.

At the completion of the startup or warmup cycle, the system will be in a ready condition for dispensing; and the system components will have predetermined states. For example, lid heater 50 may be OFF, and therefore, the temperature of heating zone 61 will not be governed by lid heater 50 but will be a function of the heat that is transferred to heating zone 61 or lid 18 by conduction and convection from heating zone 63. In the ready or dispensing condition, the temperature set point values for heaters 52, 54, 56 are set to be below the application temperature set points or the temperature of the liquid adhesive contained in the reservoir, which depend on the adhesive material being dispensed. For example, if a PSA material is in the hopper 12, the standby temperature set point may be in the range of from approximately 230° F. to approximately 300° F. Alternatively, if container 24 contains PUR material which generally has a lower application temperature, heaters 52, 54, 56 may be able to be turned off, as the heat generated by the grid and/or the reservoir may be sufficient to reach the desired temperature in zone 63. This temperature is a temperature which prevents the adhesive slug 26 from sticking to the inner walls of the hopper.

The thin walled hopper 12 is more advantageous than the thicker walled prior art devices in that the heat generated by the band heaters 52, 54, 56 is more efficiently transferred to container 24 and the slug 26 contained therein, as opposed to being maintained in the massive hoppers of the prior art. The energy requirement then can be reduced by allowing the upper hopper portion 14 to quickly heat up to the slug drop set point and to then drop to a ready or dispensing temperature which does not cause overheating or too much melting of adhesive.

While the invention has been set forth by a description of the embodiment in considerable detail, it is not intended to restrict or in any way limit the claims to such detail. Additional advantages and modifications will readily appear to those who are skilled in the art. For example, with the multi-zone hopper heater control, the end 23 of the container 24 may be either opened or closed. A different number of zones than described may also be used to advantage in various situations. Thermostats can be used instead of the temperature sensors and the PID temperature control loop. Other logic control devices such as relay logic, may be used instead of the programmable controller to control thermostatically controlled heaters, etc.

The invention, therefore, in its broadest aspects is not limited to the specific details shown and described. Accordingly, departures may be made from such details without departing from the spirit and scope of the invention.

What is claimed is:

1. Apparatus for liquifying and supplying liquified thermoplastic material, the apparatus comprising:
    a thin-walled hopper having a first space in an upper interior portion of the hopper for receiving and partially melting thermoplastic material and a second space in a lower interior portion of the hopper for more fully melting the thermoplastic material;
    a first heater operatively connected to said first space;
    a second heater operatively connected to said second space;
    a third heater operatively connected to said first space;
    a melting grid mounted in a lower portion of the second space for receiving thermoplastic material thereon;
    a fourth heater operatively connected to said melting grid; and
    a control connected to the four heaters, wherein the control operates said first heater independently of the second and fourth heaters such that said first heater and said second and fourth heaters may be operated to heat and maintain said first and second spaces at different temperatures, and the control further operates said third heater independently of said first and second heaters;
    whereby heat may be quickly transferred through the thin-walled hopper and multiple, independently controlled heating zones disposed along the hopper may be maintained at different temperatures by the respective, independently controlled heaters.

2. The apparatus of claim 1 further comprising a container support for supporting a container of thermoplastic material within the hopper such that an open end of the container faces the second space.

3. The apparatus of claim 1 wherein said hopper is formed from rolled sheet metal.

4. The apparatus of claim 3 wherein the rolled sheet metal is about 0.09 inch thick.

5. The apparatus of claim 3 wherein the sheet metal is steel.

6. The apparatus of claim 1 wherein the control operates the first heater to heat the first space at a higher temperature than the second space.

7. The apparatus of claim 6 wherein the higher temperature is above an application temperature at which liquid thermoplastic material is ultimately supplied from said apparatus.

8. The apparatus of claim 1 wherein the control operates the first heater to heat the first space at a lower temperature than the second space.

9. A method of operating a melting apparatus including a hopper having a first space for receiving thermoplastic material to be melted and a second space for melting the thermoplastic material, the method comprising the steps of:
    placing thermoplastic material within the first space;
    heating a portion of the first space at a first temperature with a first heater affixed to said hopper and heating another portion of the first space with a second heater controlled independently of the first heater, each heater operating to soften and partially melt the thermoplastic material and thereby promote movement of said thermoplastic material from the first space into the second space;
    heating the second space at a second temperature which is lower than said first temperature and which more fully melts the thermoplastic material;
    detecting movement of said thermoplastic material from said first space to said second space; and
    reducing the temperature of said first space after detecting movement of said thermoplastic material from said first space to said second space.

10. The method of claim 9 wherein the step of placing thermoplastic material within the first space further comprises placing and supporting a container of thermoplastic material within said first space with an open end of said container facing said second space.

11. The method of claim 10 wherein said hopper is formed from rolled sheet metal material.

12. The method of claim 9 wherein the second temperature is approximately 100° F. lower than the first temperature.

13. The method of claim 9 wherein said hopper is formed from rolled sheet metal material.

14. The method of claim 9 further comprising the step of reducing the first temperature when said thermoplastic material has moved from said first space to said second space.

* * * * *